US008889242B2

(12) United States Patent
Ohno et al.

(10) Patent No.: US 8,889,242 B2
(45) Date of Patent: Nov. 18, 2014

(54) HONEYCOMB STRUCTURE AND METHOD FOR MANUFACTURING HONEYCOMB STRUCTURE

(75) Inventors: Kazushige Ohno, Ibi-gun (JP); Masatoshi Okuda, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 1418 days.

(21) Appl. No.: 12/367,620

(22) Filed: Feb. 9, 2009

(65) Prior Publication Data

US 2009/0208700 A1 Aug. 20, 2009

(30) Foreign Application Priority Data

Feb. 14, 2008 (WO) .................. PCT/JP2008/052418

(51) Int. Cl.
*B01D 46/24* (2006.01)
*C04B 37/00* (2006.01)
(Continued)

(52) U.S. Cl.
CPC ........ *C04B 38/0019* (2013.01); *B01D 46/2455* (2013.01); *B01D 46/2448* (2013.01); *C04B 28/26* (2013.01); *Y02T 10/20* (2013.01); *B01J 35/04* (2013.01); *F01N 3/0222* (2013.01); *C04B 28/24* (2013.01); *C04B 28/34* (2013.01)
USPC ........................................... 428/116; 55/524

(58) Field of Classification Search
CPC C04B 38/0019; C04B 35/00; C04B 38/0006; C04B 2111/343; C04B 2235/77; F01N 2330/06; F01N 3/0222; B01J 35/04
USPC ............. 428/116, 117, 118; 55/523; 422/180, 422/181; 156/89.22; 501/89, 95.2, 133, 501/153, 154; 502/439
See application file for complete search history.

(56) References Cited

U.S. PATENT DOCUMENTS

| 6,669,751 | B1 * | 12/2003 | Ohno et al. | ...................... 55/523 |
| 6,984,253 | B2 * | 1/2006 | Ichikawa et al. | ................ 55/484 |

(Continued)

FOREIGN PATENT DOCUMENTS

| EP | 1437168 | 7/2004 |
| EP | 1710015 | 10/2006 |

(Continued)

OTHER PUBLICATIONS

Pereira et al., "Pore Structure and its Relationship to Properties of Materials," 1989 (no month date), Mat. Res. Soc. Symp. Proc., vol. 137, pp. 3-21.*

*Primary Examiner* — David Sample
*Assistant Examiner* — Nicholas W Jordan
(74) *Attorney, Agent, or Firm* — Mori & Ward, LLP

(57) ABSTRACT

A honeycomb structure includes periphery honeycomb fired bodies which include at least a single piece of a periphery small honeycomb fired body having in the cross-section a cross-sectional area which is less than about 60% of a cross-sectional area of a single piece of the center-portion honeycomb fired body. A cross-sectional area of a periphery honeycomb bonded body in the cross-section is about 60% or more of the cross-sectional area of a single piece of the center-portion honeycomb fired body. The second adhesive layer is provided between the periphery small honeycomb fired body and the at least one piece of the honeycomb fired body. The second adhesive layer has thermal conductivity higher than thermal conductivity of a first adhesive layer. The second adhesive layer has Young's modulus higher than Young's modulus of the first adhesive layer. The center-portion honeycomb fired bodies are bonded together with the first adhesive layer.

48 Claims, 7 Drawing Sheets

(51) Int. Cl.

| | | |
|---|---|---|
| C04B 41/85 | (2006.01) | |
| C04B 35/80 | (2006.01) | |
| C04B 35/565 | (2006.01) | |
| C04B 28/26 | (2006.01) | |
| C04B 38/00 | (2006.01) | |
| B01J 35/04 | (2006.01) | |
| F01N 3/022 | (2006.01) | |
| C04B 28/24 | (2006.01) | |
| C04B 28/34 | (2006.01) | |

(56) References Cited

U.S. PATENT DOCUMENTS

| | | | |
|---|---|---|---|
| 7,179,516 B2 * | 2/2007 | Ichikawa | 428/116 |
| 8,323,557 B2 * | 12/2012 | Sato | 264/630 |
| 2005/0109023 A1 * | 5/2005 | Kudo et al. | 60/311 |
| 2007/0125053 A1 | 6/2007 | Matsubara et al. | |
| 2007/0160825 A1 * | 7/2007 | Miyakawa et al. | 428/312.2 |
| 2008/0152863 A1 * | 6/2008 | Tomita et al. | 428/116 |
| 2008/0202086 A1 | 8/2008 | Ohno et al. | |
| 2008/0202087 A1 | 8/2008 | Ohno et al. | |
| 2008/0203626 A1 | 8/2008 | Ohno et al. | |
| 2008/0236394 A1 | 10/2008 | Ohno et al. | |
| 2008/0237941 A1 | 10/2008 | Ohno et al. | |
| 2008/0241501 A1 * | 10/2008 | Ohno et al. | 428/305.5 |
| 2008/0286523 A1 | 11/2008 | Ohno et al. | |
| 2009/0011178 A1 * | 1/2009 | Masukawa et al. | 428/116 |
| 2009/0130378 A1 * | 5/2009 | Imaeda et al. | 428/116 |
| 2012/0110965 A1 * | 5/2012 | Cai et al. | 55/523 |

FOREIGN PATENT DOCUMENTS

| | | |
|---|---|---|
| JP | 2003-275522 | 9/2003 |
| JP | 2006-289237 | 10/2006 |
| WO | WO 01/23069 | 4/2001 |
| WO | WO 2004/096414 | 11/2004 |

* cited by examiner

A-A line cross-sectional view

HONEYCOMB STRUCTURE AND METHOD FOR MANUFACTURING HONEYCOMB STRUCTURE

CROSS-REFERENCE TO RELATED APPLICATIONS

The present application claims priority under 35 U.S.C. §119 to PCT Application No. PCT/JP2008/052418, filed Feb. 14, 2008, the contents of which are incorporated herein by reference in their entirety.

BACKGROUND OF THE INVENTION

1. Field of the Invention

This invention relates to a honeycomb structure and a method for manufacturing a honeycomb structure.

2. Discussion of the Background

In recent years, particulate matter (hereinafter, also referred to as PM) such as soot contained in exhaust gases discharged from internal combustion engines of vehicles such as buses and trucks, construction machines and the like, and other harmful contaminants have raised serious problems to the environment and the human body.

For this reason, various porous ceramic honeycomb structures have been proposed as filters that capture PM in exhaust gases and purify the exhaust gases and also as catalyst supporting carriers that convert contaminants such as CO and HC in exhaust gases by allowing the exhaust gases to pass through the inside of the catalyst supporting carriers.

With respect to such a honeycomb structure, there has been known an aggregated honeycomb structure formed by combining a plurality of honeycomb fired bodies each having a large number of cells longitudinally placed in parallel with one another. In such an aggregated honeycomb structure, an adhesive layer is formed on each of side faces of the honeycomb fired bodies, and the respective honeycomb fired bodies are bonded to one another with the adhesive layer interposed therebetween.

Upon use of a honeycomb structure for purifying or converting exhaust gases, the honeycomb structure allows high-temperature exhaust gases to flow through cells of the honeycomb structure. Consequently, thermal shock is applied to the honeycomb structure during use, and when the thermal shock is increased, the honeycomb structure tends to be damaged.

However, by combining honeycomb fired bodies with one another with an adhesive layer interposed therebetween to form an aggregated honeycomb structure, the thermal shock applied to the honeycomb structure is presumably alleviated by the adhesive layer so that it is possible to prevent the damage in the honeycomb structure.

WO 01/23069 A1 has described, as an aggregated honeycomb structure, a honeycomb structure formed as follows: using rectangular pillar-shaped honeycomb fired bodies having a square shape in its cross-section taken perpendicular to the longitudinal direction thereof; integrating a plurality of the honeycomb fired bodies by bonding with an adhesive layer containing an adhesive interposed therebetween; and cutting a periphery into a round pillar-shape.

The adhesive layer in the honeycomb structure described in WO 01/23069 A1 contains inorganic fibers, an inorganic binder, an organic binder and inorganic particles, and its thermal conductivity is 0.1 to 10 W/mK. Moreover, all the honeycomb fired bodies are bonded to one another with the adhesive layer having the same composition.

Here, in processes for manufacturing a honeycomb structure described in WO 01/23069 A1, honeycomb fired bodies located at four corners of the rectangular pillar-shaped integral body of the honeycomb fired bodies prior to the periphery cutting are mostly cut off in the periphery cutting. As a result, the cross-sectional areas of the respective honeycomb fired bodies located at the four corners are smaller than those of the honeycomb fired bodies located in a center portion in the cross-section of the honeycomb structure (hereinafter, referred to as center-portion honeycomb fired bodies).

The contents of WO 01/23069 A1 are incorporated herein by reference in their entirety.

SUMMARY OF THE INVENTION

According to one aspect of the present invention a honeycomb structure includes a plurality of honeycomb fired bodies and an adhesive layer. Each of the plurality of honeycomb fired bodies has cell walls extending along a longitudinal direction of the honeycomb structure to define cells. An adhesive layer is provided between the honeycomb fired bodies to connect the honeycomb fired bodies. The honeycomb fired bodies include center-portion honeycomb fired bodies and periphery honeycomb fired bodies. The center-portion honeycomb fired bodies are located at a center portion of a cross-section of the honeycomb structure perpendicular to the longitudinal direction. The periphery honeycomb fired bodies form a part of a periphery of the cross-section. The periphery honeycomb fired bodies include at least a single piece of a periphery small honeycomb fired body having in the cross-section a cross-sectional area which is less than about 60% of a cross-sectional area of a single piece of the center-portion honeycomb fired body. A cross-sectional area of a periphery honeycomb bonded body in the cross-section is about 60% or more of the cross-sectional area of a single piece of the center-portion honeycomb fired body. The periphery honeycomb bonded body includes the periphery small honeycomb fired body, at least one piece of the honeycomb fired body, and a second adhesive layer. The second adhesive layer is provided between the periphery small honeycomb fired body and the at least one piece of the honeycomb fired body to bond the periphery small honeycomb fired body and the at least one piece of the honeycomb fired body. The center-portion honeycomb fired bodies are bonded together with the first adhesive layer. The second adhesive layer has thermal conductivity higher than thermal conductivity of a first adhesive layer. The second adhesive layer has Young's modulus higher than Young's modulus of the first adhesive layer.

According to another aspect of the present invention, a method for manufacturing a honeycomb structure includes molding a wet mixture containing ceramic powders and a binder to produce honeycomb molded bodies. The honeycomb molded bodies are fired to manufacture honeycomb fired bodies each having cell walls extending along a longitudinal direction of the honeycomb structure to define cells. A first adhesive paste is provided to form a first adhesive paste layer between center-portion honeycomb fired bodies among the honeycomb fired bodies in order to connect the center-portion honeycomb fired bodies. The center-portion honeycomb fired bodies are located at a center portion of a cross-section of the honeycomb structure perpendicular to the longitudinal direction. Pre-periphery honeycomb fired bodies are provided among the honeycomb fired bodies having pre-periphery small honeycomb fired body to be a periphery small honeycomb fired body. The pre-periphery honeycomb fired bodies are to be periphery honeycomb fired bodies which form a part of a periphery of the honeycomb structure and which include at least a single piece of a periphery small honeycomb fired body having in the cross-section a cross-sectional area which is less than about 60% of a center-portion cross-sectional area of a single piece of the center-portion honeycomb fired body. A second adhesive paste is provided to form a second adhesive paste layer between the pre-periphery small honeycomb fired body and at least one piece of the honeycomb fired body to bond the pre-periphery small honeycomb fired body and the at least one piece of the honeycomb fired body in order to produce a periphery honeycomb bonded body. A honeycomb aggregated body includes the connected center-portion honeycomb fired bodies and the periphery honeycomb bonded body. A cross-sectional area of the periphery honeycomb bonded body in the cross-section is about 60% or more of the center-portion cross-sectional area. The second adhesive layer has thermal conductivity higher than thermal conductivity of the first adhesive layer. The second adhesive layer has Young's modulus higher than Young's modulus of the first adhesive layer. The first adhesive paste layer and the second adhesive paste layer are dried and solidified to produce a ceramic block.

According to another aspect of the present invention, a method for manufacturing a honeycomb structure includes molding a wet mixture containing ceramic powders and a binder to produce honeycomb molded bodies. The honeycomb molded bodies are fired to manufacture honeycomb fired bodies each having cell walls extending along a longitudinal direction of the honeycomb structure to define cells. A first adhesive paste is provided to form a first adhesive paste layer between center-portion honeycomb fired bodies among the honeycomb fired bodies in order to connect the center-portion honeycomb fired bodies, the center-portion honeycomb fired bodies being located at a center portion of a cross-section of the honeycomb structure perpendicular to the longitudinal direction. Pre-periphery honeycomb fired bodies are provided among the honeycomb fired bodies having pre-periphery small honeycomb fired body to be a periphery small honeycomb fired body. The pre-periphery honeycomb fired bodies are to be periphery honeycomb fired bodies which forms a part of a periphery of the honeycomb structure and which includes at least a single piece of a periphery small honeycomb fired body having in the cross-section a cross-sectional area which is less than about 60% of a center-portion cross-sectional area of a single piece of the center-portion honeycomb fired body. A second adhesive paste is provided to form a second adhesive paste layer between the pre-periphery small honeycomb fired body and at least one piece of the honeycomb fired body to bond the pre-periphery small honeycomb fired body and the at least one piece of the honeycomb fired body in order to produce a periphery honeycomb bonded body. A honeycomb aggregated body includes the connected center-portion honeycomb fired bodies and the periphery honeycomb bonded body. A cross-sectional area of the periphery honeycomb bonded body in the cross-section is about 60% or more of the center-portion cross-sectional area. The second adhesive layer has thermal conductivity higher than thermal conductivity of the first adhesive layer. The second adhesive layer has Young's modulus higher than Young's modulus of the first adhesive layer. The first adhesive paste layer is heated at a first temperature. The second adhesive paste layer is heated at a second temperature which is different from the first temperature to produce a ceramic block.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
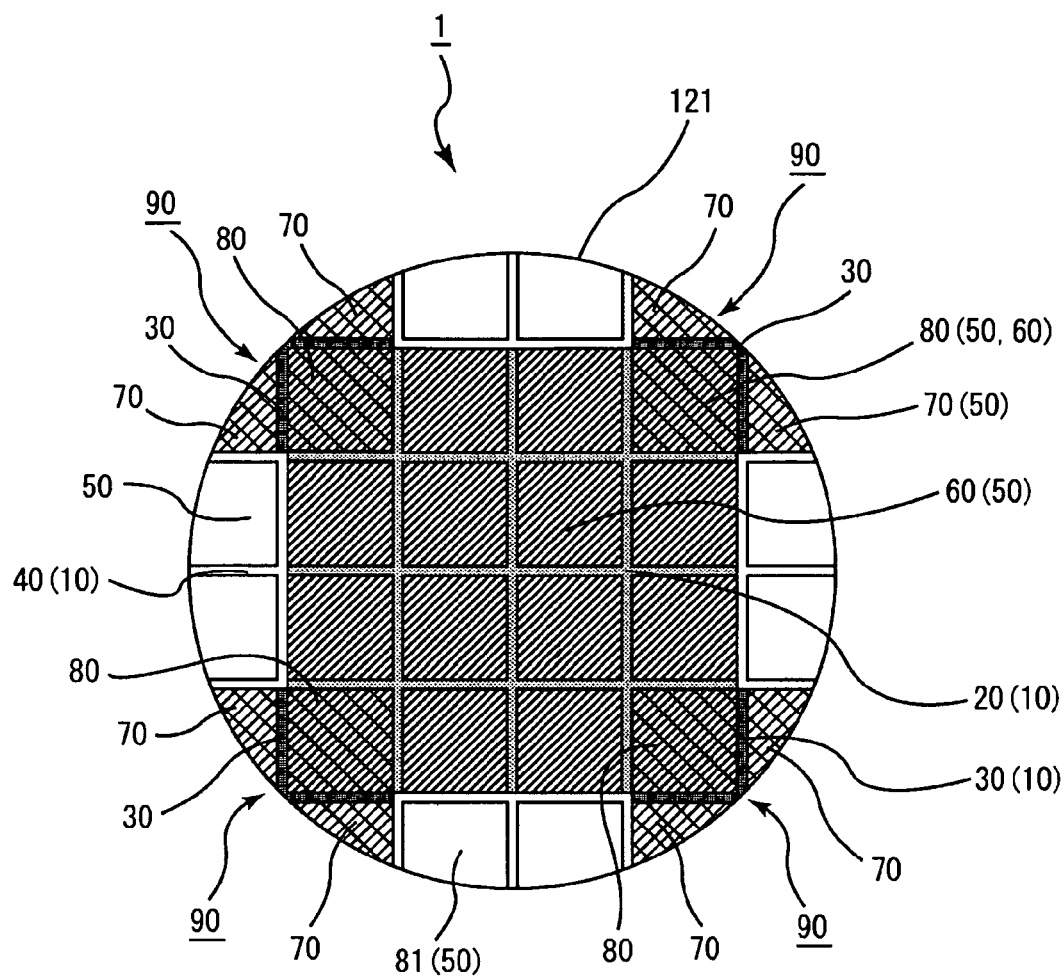
FIG. 1 is a cross-sectional view that schematically shows one example of a honeycomb structure according to one embodiment of the present invention.

Embodiments will now be described with reference to the accompanying drawings, wherein like reference numerals designate corresponding or identical elements throughout the various drawings.

Upon use of a honeycomb structure for purifying or converting exhaust gases, high-temperature exhaust gases discharged from an internal combustion engine are allowed to flow through cells of the honeycomb structure. Then, since a large amount of heat is applied to the center-portion honeycomb fired bodies, the center-portion honeycomb fired bodies tend to cause a temperature rise in comparison with honeycomb fired bodies located on the peripheral portion (hereinafter, referred to as periphery honeycomb fired bodies).

In such a conventional aggregated honeycomb structure, a large temperature difference tends to occur between the center portion and the peripheral portion of the honeycomb structure. The large temperature difference tends to cause thermal stress on the honeycomb structure, sometimes resulting in damage in the honeycomb structure.

In particular, damage frequently tends to occur in honeycomb fired bodies located on the peripheral portion of the honeycomb structure and having a small cross-sectional area, that is, honeycomb fired bodies mostly cut off in the periphery cutting and having a cross-sectional area less than about 60% of the cross-sectional area of the center-portion honeycomb fired body.

Here, in the present description, a honeycomb fired body that forms a part of the periphery of the cross-section of the honeycomb structure and has a cross-sectional area less than about 60% of the cross-sectional area of the center-portion honeycomb fired body is referred to as a periphery small honeycomb fired body.

Here, in the present description, "the cross-sectional area" refers to a cross-sectional area of a unit: a honeycomb fired body, a honeycomb structure and the like, whose cross-sectional area is to be defined in a cross-section taken perpendicular to the longitudinal direction of the unit. Moreover, "the cross-section" refers to a cutting plane obtained by cutting the unit to be cut perpendicularly to the longitudinal direction thereof.

The periphery small honeycomb fired body is far from the center portion of the honeycomb structure in the cross-section of the honeycomb structure. Moreover, the honeycomb fired body is separated from an other honeycomb fired body by an adhesive layer having low thermal conductivity. For this reason, the periphery small honeycomb fired body is presumably more susceptible to the temperature difference between the center portion and the peripheral portion of the honeycomb structure, and thereby tends to be damaged.

In the honeycomb structure described in WO 01/23069 A1, enhancement of thermal conductivity of the adhesive layer leads to improvement of the thermal conductivity property inside the honeycomb structure, thereby making it possible to avoid damage in the honeycomb structure caused by a thermal stress.

However, even when such a honeycomb structure is used as an exhaust-gas purifying filter, damage possibly occurs in the honeycomb structure.

In particular, when manufacturing a large-size honeycomb structure (for example, having a diameter of about 200 mm or more), the possibility of occurrence of damage in the honeycomb structure tends to increase.

For this reason, there have been strong demands for further improving the thermal shock resistance of the honeycomb structure.

The inventors of the present invention observed damage in a honeycomb structure in which honeycomb fired bodies are bonded to one another by an adhesive layer having high thermal conductivity.

Consequently, it is found that not the periphery small honeycomb fired body, but the center-portion honeycomb fired body is frequently damaged.

Based upon this fact, it is found that the honeycomb structure needs to have adhesive layers having different properties from each other in the center portion and the peripheral portion.

Thus, the inventors of the present invention have found that by forming an adhesive layer having high thermal conductivity at a predetermined portion and an adhesive layer having low Young's modulus at a predetermined portion, it may become easier to avoid damage in the honeycomb structure, and have finally completed the present invention.

A honeycomb structure according to embodiments of the present invention includes a plurality of honeycomb fired bodies combined with one another with an adhesive layer interposed therebetween, each of the honeycomb fired bodies having a large number of cells longitudinally placed in parallel with one another with a cell wall interposed therebetween, wherein the honeycomb fired bodies include a center-portion honeycomb fired body located in a center portion of a cross-section taken perpendicular to the longitudinal direction of the honeycomb structure, and periphery honeycomb fired bodies that form a part of a periphery of the cross-section; the periphery honeycomb fired bodies include at least a single piece of a periphery small honeycomb fired body having a cross-sectional area in the cross-section of less than about 60% of a cross-sectional area of a single piece of the center-portion honeycomb fired body; a cross-sectional area of a periphery honeycomb bonded body in the cross-section is about 60% or more of the cross-sectional area of a single piece of the center-portion honeycomb fired body, the periphery honeycomb bonded body formed by bonding the periphery small honeycomb fired body and at least a single piece of an other honeycomb fired body with an adhesive layer B (a second adhesive layer) interposed therebetween; and the adhesive layer B has higher thermal conductivity and higher Young's modulus than those of an adhesive layer A (a first adhesive layer), the adhesive layer A being defined as an adhesive layer bonding the center-portion honeycomb fired bodies to one another.

With reference to the figure, the center-portion honeycomb fired body, the periphery small honeycomb fired body, the periphery honeycomb bonded body, the adhesive layer A and the adhesive layer B in the honeycomb structure according to the embodiments of the present invention will be described.

FIG. 1 is a cross-sectional view that schematically shows one example of a honeycomb structure according to one embodiment of the present invention.

Here, in the present description, respective cross-sectional views are illustrated, with cells of the honeycomb fired bodies being omitted for simplicity of description.

In a honeycomb structure 1, 32 pieces of honeycomb fired bodies 50 are combined with one another with an adhesive layer 10 interposed therebetween. In the cross-section, 16 pieces of honeycomb fired bodies 50 which do not form any part of the periphery of the honeycomb structure 1 correspond to the central-portion honeycomb fired bodies.

Further, an adhesive layer 20 bonding the central-portion honeycomb fired bodies to one another corresponds to the adhesive layer A.

Moreover, a honeycomb fired body 70, which constitutes a part of the periphery 121 of the honeycomb structure 1 and has a cross-sectional area in the cross-section of less than about 60% of the cross-sectional area of a single piece of the center-portion honeycomb fired bodies 60, corresponds to the periphery small honeycomb fired body. In a honeycomb structure shown in FIG. 1 includes 8 pieces of the periphery small honeycomb fired bodies 70.

Each of the periphery small honeycomb fired bodies 70 is bonded to an other adjacent honeycomb fired body 80 with an adhesive layer 30 interposed therebetween. The adhesive layer 30 corresponds to the adhesive layer B that has higher thermal conductivity than that of the adhesive layer A and higher Young's modulus than that of the adhesive layer A.

In the honeycomb structure 1 shown in FIG. 1, two periphery small honeycomb fired bodies 70 adjacent to a single piece of the honeycomb fired body 80 are respectively bonded to the honeycomb fired body 80 with the adhesive layer B (adhesive layer 30) interposed therebetween, to form a periphery honeycomb bonded body 90 including the three honeycomb fired bodies bonded to one another.

The periphery honeycomb bonded body has a structure in which the periphery small honeycomb fired bodies are bonded to an other honeycomb fired body with the adhesive layer B interposed therebetween, so that its cross-sectional area is about 60% or more of the cross-sectional area of a single piece of the center-portion honeycomb fired body.

The number of honeycomb fired bodies that constitute the periphery honeycomb bonded body and a combination of the shapes thereof are not particularly limited. In the honeycomb structure shown in FIG. 1, a bonded body including a single piece of the honeycomb fired body 80 and a single piece of the periphery small honeycomb fired body 70 is also included in the periphery honeycomb bonded body.

The honeycomb structure shown in FIG. 1 has a honeycomb fired body 50 that is included in neither the center-portion honeycomb fired body 60 nor the periphery honeycomb bonded body 90. The kind of an adhesive layer adjacent to the honeycomb fired body 50 is not particularly limited, that is, the adhesive layer may be the adhesive layer A or the adhesive layer B, or may be an adhesive layer of another kind.

In the honeycomb structure 1 shown in FIG. 1, an adhesive layer 40 of another kind is formed.

The honeycomb structure according to the embodiments of the present invention includes the periphery honeycomb bonded body in which the periphery small honeycomb fired body and at least a single piece of an other honeycomb fired body are bonded to one another with the adhesive layer B having high thermal conductivity interposed therebetween.

Since the periphery honeycomb bonded body is formed by bonding with the adhesive layer B having higher thermal conductivity, the thermal conductivity property inside the periphery honeycomb bonded body tends to be high. Therefore, it may become easier to uniform the temperature distribution inside the periphery honeycomb bonded body.

Therefore, in the honeycomb structure according to the embodiments of the present invention, upon thinking of the temperature distribution, the periphery honeycomb bonded body, which has a relatively large cross-sectional area of about 60% or more of the cross-sectional area of a single piece of the center-portion honeycomb fired body, can be regarded as a single piece of the honeycomb fired body.

That is, the honeycomb structure according to the embodiments of the present invention is regarded to have no honeycomb fired bodies that constitutes the periphery of the honeycomb structure and have a small cross-sectional area.

Moreover, the center-portion honeycomb fired bodies are bonded to one another with the adhesive layer A having low Young's modulus interposed therebetween. For this reason, the thermal stress to be applied to the center-portion honeycomb fired bodies tends to be alleviated, and thereby it may become easier to avoid damage in the center-portion honeycomb fired bodies.

Namely, in the honeycomb structure according to the embodiments of the present invention, at least two kinds of adhesive layers are formed in desirable portions respectively to bond the honeycomb fired body to one another. Therefore, it may become easier to avoid damage in the honeycomb structure.

First, the thermal conductivity property of the periphery small honeycomb fired bodies tends to be improved by forming the adhesive layer B having higher thermal conductivity at a portion requiring the higher thermal conductivity. As a result, it may become easier to prevent damage in the periphery small honeycomb fired bodies.

Moreover, thermal stress to be applied to the center-portion honeycomb fired bodies tends to be alleviated by forming the adhesive layer A having lower Young's modulus at a portion requiring not so high thermal conductivity. As a result, it may become easier to avoid damage in the center-portion honeycomb fired bodies.

In the honeycomb structure according to the embodiments of the present invention, the periphery small honeycomb fired body is bonded to a honeycomb fired body having a largest cross-sectional area in the cross-section among a plurality of honeycomb fired bodies adjacent to the periphery small honeycomb fired body, with the adhesive layer B interposed therebetween.

With reference to the honeycomb structure 1 shown in FIG. 1, the following description will discuss the sizes and positions of honeycomb fired bodies to be bonded to the periphery small honeycomb fired body by the adhesive layer B.

Two honeycomb fired bodies are adjacent to the periphery small honeycomb fired body 70. One is a honeycomb fired body 80 having a square shape in its cross-section, and the other is a honeycomb fired body 81 having a cross-section with a partially substantially curved periphery. Here, the substantially curved portion of the honeycomb fired body 81 forms the periphery of the honeycomb structure 1.

Out of a plurality of honeycomb fired bodies adjacent to the periphery small honeycomb fired body 70 (honeycomb fired body 80 and honeycomb fired body 81), the honeycomb fired body having the largest cross-sectional area in the cross-section is the honeycomb fired body 80.

Moreover, the honeycomb fired body 80 is also included in the center-portion honeycomb fired body 60. For this reason, when the honeycomb fired body 80 and the periphery small honeycomb fired body 70 are bonded to each other with the adhesive layer B interposed therebetween, the temperature difference between the periphery small honeycomb fired body and the honeycomb fired bodies located in a center portion of the honeycomb structure tends to be smaller. As a result, it may become easier to reduce the thermal stress to be applied to the periphery small honeycomb fired body.

In the honeycomb structure according to the embodiments of the present invention, an adhesive layer bonding honeycomb fired bodies other than the periphery small honeycomb fired body to one another is the adhesive layer A.

The adhesive layer used for bonding honeycomb fired bodies other than the periphery small honeycomb fired body to one another is formed at a portion requiring not so high thermal conductivity. Thermal stress to be applied to the honeycomb fired bodies tends to be alleviated by forming the adhesive layer A having lower Young's modulus at the portion. As a result, it may become easier to effectively avoid damage in the honeycomb fired bodies.

The honeycomb structure according to the embodiments of the present invention tends to prevent damage due to a thermal stress and tends to have high thermal shock resistance.

First Embodiment

With reference to the figures, the following description will discuss a first embodiment that is one embodiment of the honeycomb structure of the present invention.

Figure 2:
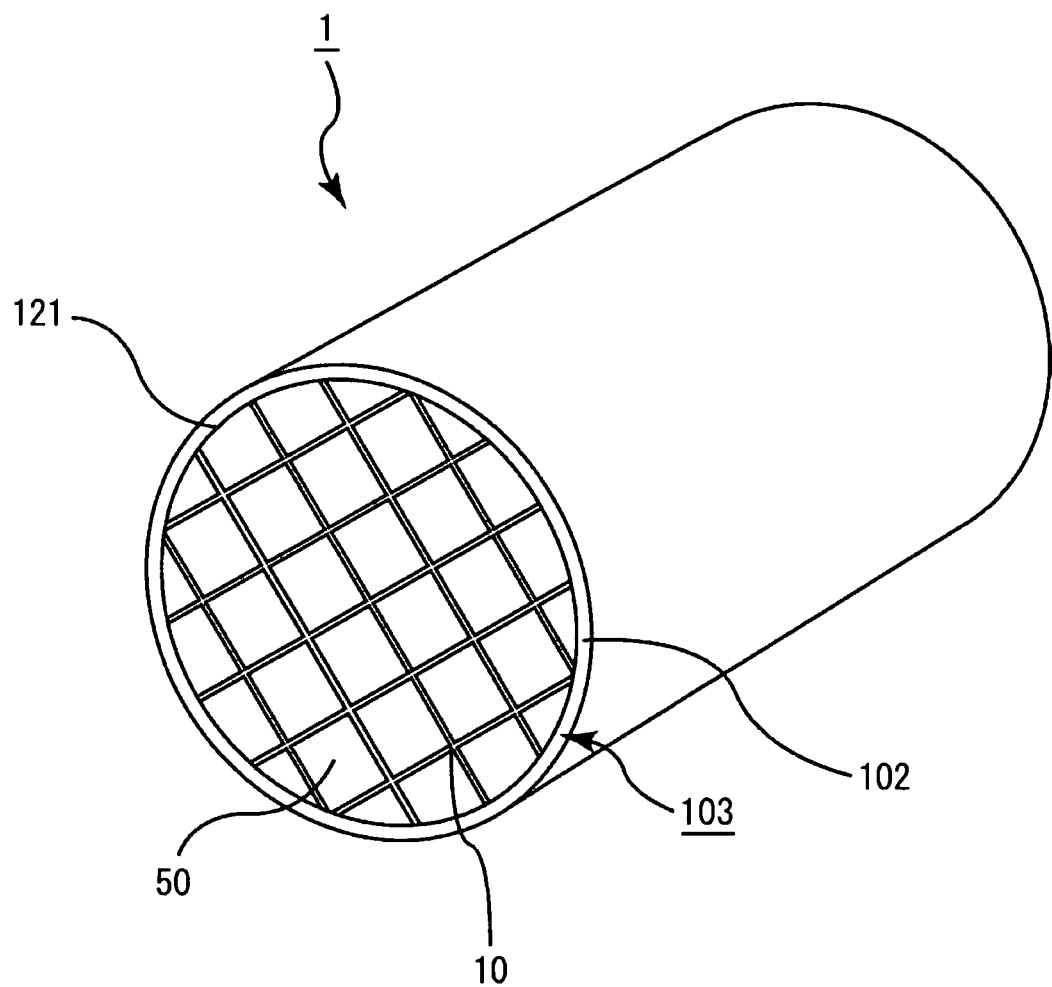
FIG. 2 is a perspective view that schematically shows one example of the honeycomb structure according to one embodiment of the present invention.
Figure 3A:
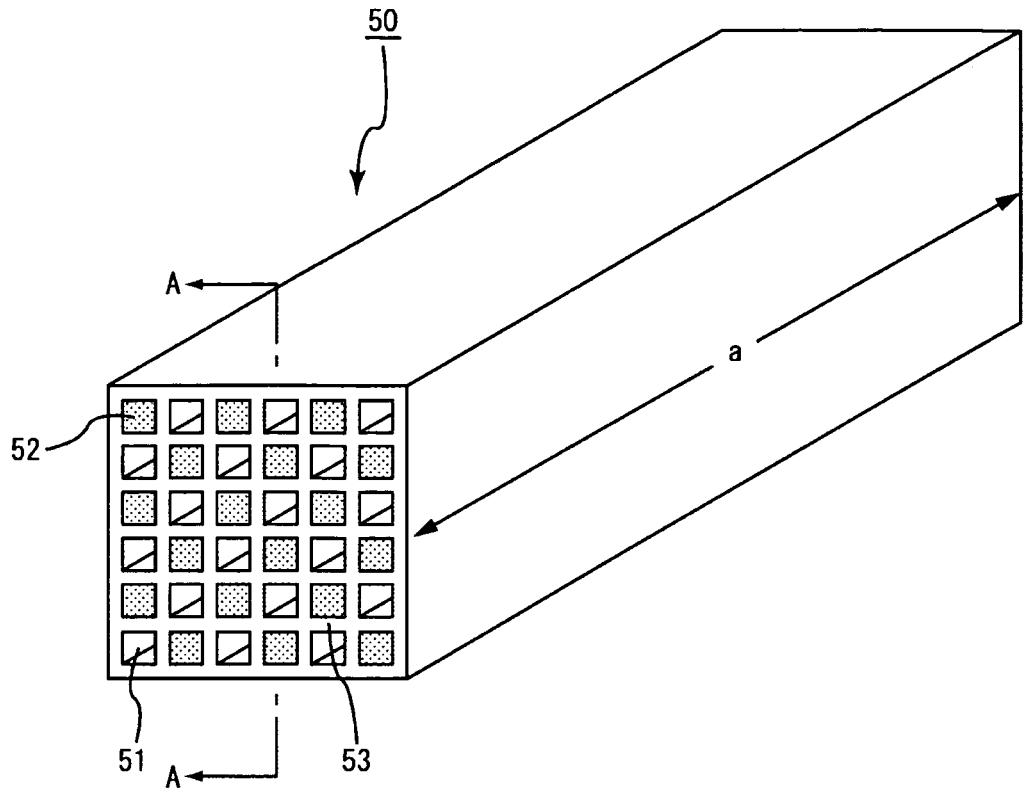
FIG. 3A is a perspective view that schematically shows one example of a honeycomb fired body constituting the honeycomb structure according to one embodiment of the present invention.

FIG. 2 is a perspective view that schematically shows one example of a honeycomb structure according to one embodiment of the present invention. FIG. 3A is a perspective view that schematically shows one example of a honeycomb fired body constituting the honeycomb structure according to one embodiment of the present invention, and FIG. 3B is an A-A line cross-sectional view of FIG. 3A.

Figure 3B:
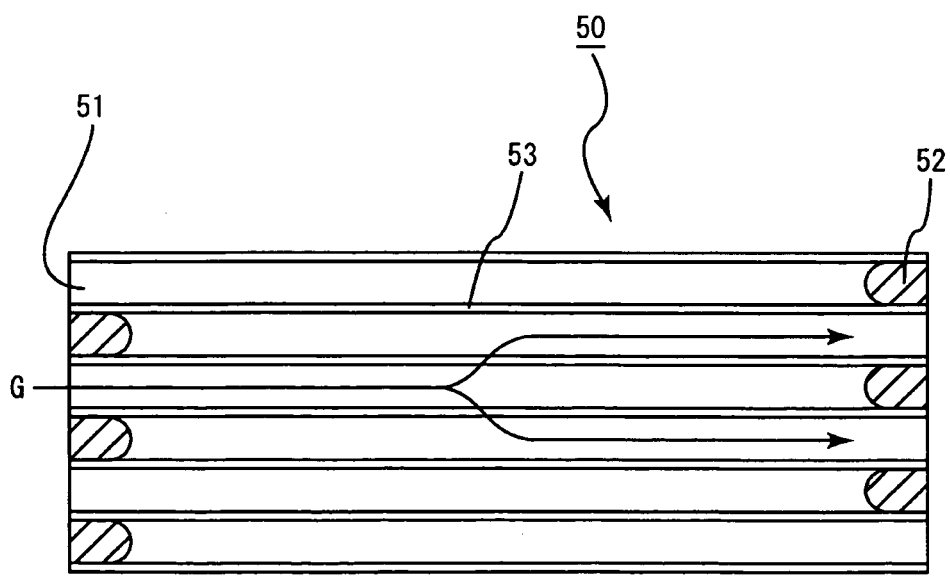
FIG. 3B is an A-A line cross-sectional view of FIG. 3A.

As shown in FIG. 2, a honeycomb structure 1 has a structure in which 32 pieces of porous silicon carbide honeycomb fired bodies 50 having a shape shown in FIGS. 3A and 3B are combined with one another with an adhesive layer 10 interposed therebetween to form a ceramic block 103.

Further, a sealing material layer (coat layer) 102 is formed on the periphery 121 of the ceramic block 103.

The honeycomb fired body 50 shown in FIGS. 3A and 3B has a structure in which a large number of cells 51 are longitudinally placed (the direction a in FIG. 3A) in parallel with one another with a cell wall 53 therebetween, and either one end of each of the cells 51 is sealed with a plug 52. Therefore, exhaust gases G having flowed into one of the cells 51 with an opening end on one end face surely passes through the cell wall 53 that separates the cells 51, and flows out from another cell 51 with an opening end on the other end face.

Therefore, the cell wall 53 functions as a filter for capturing PM and the like.

As having been described using FIG. 1, in the honeycomb structure 1, 16 pieces of the center-portion honeycomb fired bodies 60 are placed, and the center-portion honeycomb fired bodies 60 are bonded to one another with the adhesive layer A (adhesive layer 20) interposed therebetween.

Moreover, near the periphery 121 of the cross-section of the honeycomb structure 1, the periphery honeycomb bonded bodies 90 each formed by bonding the periphery small honeycomb fired bodies 70 to the other honeycomb fired body 80 are placed. The periphery small honeycomb fired bodies 70 and the other honeycomb fired body 80 are bonded to each other with the adhesive layer B (adhesive layer 30) interposed therebetween.

The adhesive layer B has higher Young's modulus than that of the adhesive layer A. The Young's modulus of the adhesive layer is calculated as follows: preparing a measuring sample by cutting out a portion of the adhesive layer from the honeycomb structure; determining a stress-strain curve of the measuring sample; and determining an initial inclination of the curve.

In order to determine the stress-strain curve, an autograph or the like may be used.

Desirable Young's modulus of the adhesive layer A is at least about 0.1 GPa and at most about 3 GPa, and desirable Young's modulus of the adhesive layer B is at least about 3 GPa and at most about 15 GPa.

Here, the thermal conductivity of the adhesive layer B is higher than that of the adhesive layer A. The thermal conductivity of the adhesive layer is determined as follows: preparing a measuring sample by cutting out a portion of the adhesive layer from the honeycomb structure; and carrying out a thermal conductivity measuring method such as a laser flash method on the measuring sample.

Desirable thermal conductivity of the adhesive layer A is at least about 0.05 W/mK and at most about 0.3 W/mK, and desirable thermal conductivity of the adhesive layer B is at least about 0.3 W/mK and at most about 1 W/mK.

Compositions of the adhesive layer A and the adhesive layer B are not particularly limited as long as both of the adhesive layer A and the adhesive layer B have thermal conductivity and Young's modulus falling in the above-mentioned ranges, respectively. For example, the adhesive layer B may have composition with a higher density than that of the adhesive layer A (the adhesive layer A may have composition with a lower density than that of the adhesive layer B.)

By adopting the above-mentioned compositions, the adhesive layer B tends to have higher thermal conductivity and higher Young's modulus than those of the adhesive layer A.

In the present embodiment, the main components of the adhesive paste preferably include inorganic fibers and an inorganic binder, inorganic particles and an inorganic binder, or inorganic fibers, inorganic particles and an inorganic binder.

With respect to the ratios of the respective components, when the inorganic fibers and the inorganic binder, or the inorganic particles and the inorganic binder are contained as main components, the content of the inorganic fibers or the inorganic particles is preferably at least about 70% by weight and at most about 95% by weight relative to at least about 5% by weight and at most about 30% by weight of the inorganic binder as solids content, and when the inorganic fibers, the inorganic particles and the inorganic binder are contained as main components, the content of the inorganic particles is preferably at least about 35% by weight and at most about 65% by weight and the content of the inorganic fibers is preferably at least about 30% by weight to and at most about 60% by weight relative to at least about 5% by weight and at most about 30% by weight of the inorganic binder as solids content.

The adhesive layer may contain an organic binder. However, upon use of the honeycomb structure as an exhaust-gas purifying filter, the temperature thereof rises so high that the organic binder is easily decomposed and disappears, leading to fluctuation of the adhesive strength. Therefore, the organic binder is desirably contained in as small an amount as possible.

The thickness of the adhesive layer is preferably at least about 0.5 mm and at most about 2.0 mm.

The adhesive layer having a thickness of about 0.5 mm or more tends not to have a low adhesive strength, and the adhesive layer having a thickness of about 2.0 mm or less tends not to lead to a low aperture ratio of the cells. As a result, a honeycomb structure having such an adhesive layer tends not to have lower performance when used as an exhaust-gas purifying filter. Moreover, the adhesive layer having a thickness of about 2.0 mm or less tends not to cause an increase in the pressure loss.

The following description will discuss a method for manufacturing a honeycomb structure of the present embodiment.

First, a combining process configured to manufacture a ceramic block by bonding a plurality of honeycomb fired bodies to one another with an adhesive layer interposed therebetween will be described, and then all the manufacturing processes of a honeycomb structure will be described.

The method for bonding honeycomb fired bodies to one another is not particularly limited, but preferably includes the following procedure: forming an adhesive paste layer between the honeycomb fired bodies to manufacture a honeycomb aggregated body; and manufacturing a ceramic block by forming an adhesive layer through drying and solidifying the adhesive paste layer.

Here, examples of the respective methods for forming the adhesive layer A and the adhesive layer B include methods described below.

First, an adhesive paste containing inorganic fibers and an inorganic binder, inorganic particles and an inorganic binder, or inorganic fibers, inorganic particles and an inorganic binder, as its main components is prepared.

In order to form the adhesive layer A having a low density and the adhesive layer B having a high density respectively, plural kinds of adhesive pastes are desirably prepared.

An adhesive paste used for forming the adhesive layer A is an adhesive paste A (a first adhesive paste) and an adhesive paste used for forming the adhesive layer B is an adhesive paste B (a second adhesive paste).

Compared to the adhesive paste B, the adhesive paste A used for forming the adhesive layer A having a low density preferably has the following characteristics: a higher water content; a longer fiber length of the inorganic fibers; and the like.

The adhesive paste A may possess all the characteristics, or may possess only some of the characteristics.

On the other hand, compared to the adhesive paste A, the adhesive paste B used for forming the adhesive layer B having a high density preferably has the following characteristics: a lower water content; a shorter fiber length of the inorganic fibers; and the like.

The adhesive paste B may possess all the characteristics, or may possess only some of the characteristics.

For example, the water content of the adhesive paste A is desirably at least about 30% by weight and at most about 50% by weight, and the water content of the adhesive paste B is desirably at least about 10% by weight and at most about 30% by weight.

Moreover, the desirable fiber length (average fiber length) of inorganic fibers contained in the adhesive paste A is at least about 20 μm and at most about 1000 μm, and the desirable fiber length (average fiber length) of inorganic fibers contained in the adhesive paste B is at least about 1 μm and at most about 20 μm.

Here, upon adjusting the water content of the adhesive pastes, a method may be used in which, voids are formed by adding a pore-forming agent to obtain a relatively low water content.

Alternatively, by changing the kind of the inorganic binder in the adhesive paste, the properties of the adhesive layer may be adjusted.

For example, an adhesive layer A having a low density can be formed by using silica sol as the inorganic binder, while an adhesive layer B having a high density can be formed by using aluminum phosphate or water glass as the inorganic binder.

Successively, an adhesive paste layer is formed on each of the side faces of the honeycomb fired bodies by using the adhesive paste to manufacture a honeycomb aggregated body which has a predetermined number of honeycomb fired bodies and the adhesive paste layer is formed between the honeycomb fired bodies.

Figure 4:
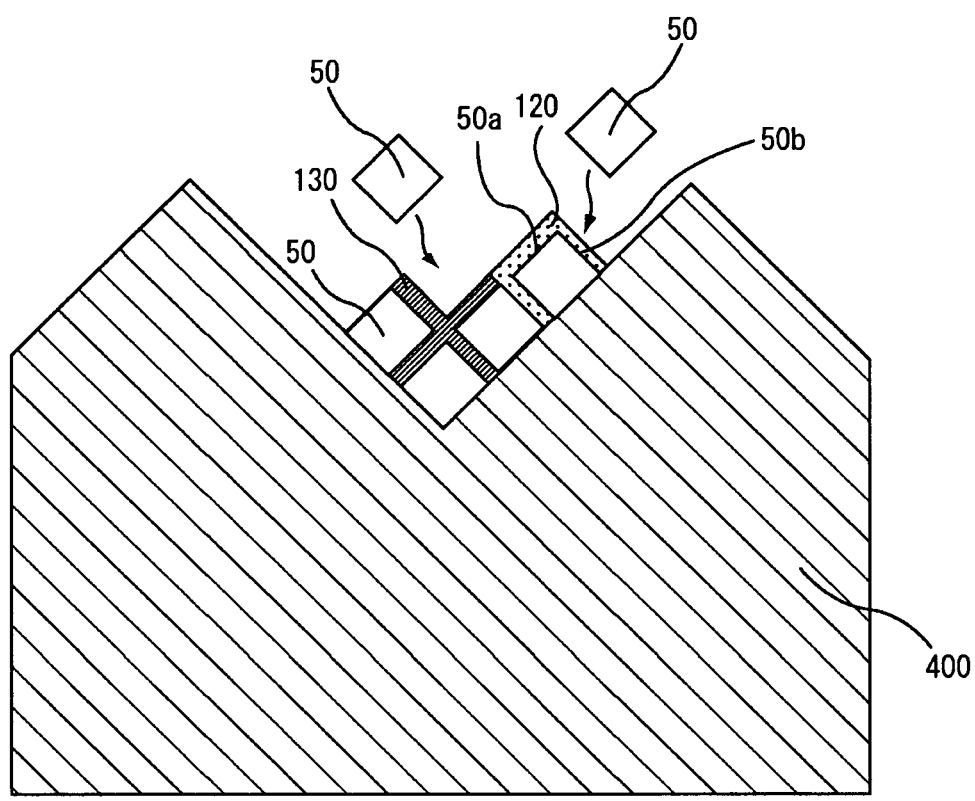
FIG. 4 is a cross-sectional view that schematically shows one example of a method for forming an adhesive paste layer on each side face of the honeycomb fired bodies according to an embodiment of the present invention.

FIG. 4 is a cross-sectional view that schematically shows one example of a method for forming the adhesive paste layer on each side face of the honeycomb fired bodies.

The method for forming the adhesive paste layer is not particularly limited. For example, an adhesive paste layer having a predetermined thickness is formed as follows: placing a honeycomb fired body 50 on a base having a V-shaped cut surface along the V-shape of the base; and applying the adhesive paste to two side faces (50a and 50b) facing upward of the honeycomb fired body 50 by using a squeegee or the like.

At this time, the adhesive paste layer 120 and the adhesive paste layer 130 are formed by using two kinds of the adhesive pastes: the adhesive paste A; and the adhesive paste B.

Next, an other honeycomb fired body 50 is placed on the adhesive paste layer. Then, the adhesive paste is further applied to the side face facing upward of the other honeycomb fired body 50, so that an adhesive paste layer is formed. Then, by repeatedly laminating another honeycomb fired body on the adhesive paste layer, a honeycomb aggregated body including a predetermined number of honeycomb fired bodies with the adhesive paste layer interposed therebetween was manufactured.

Figure 5:
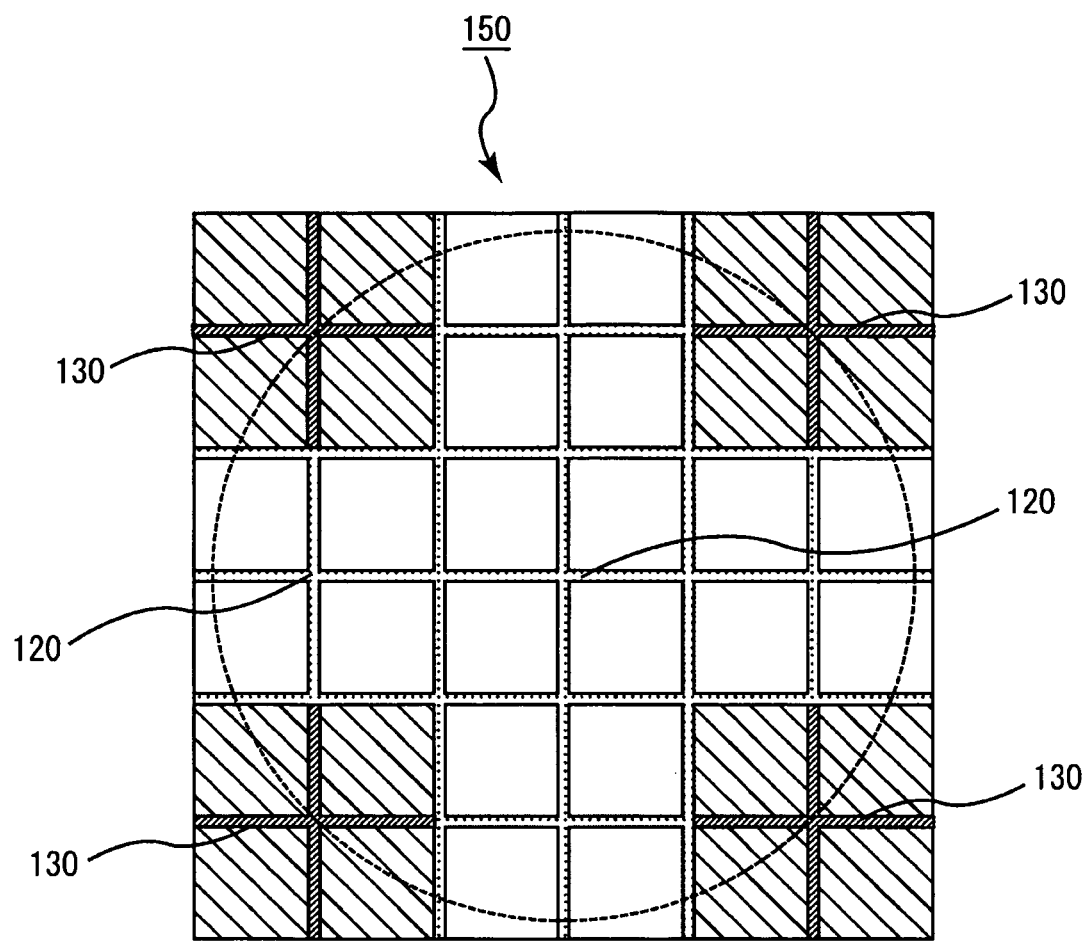
FIG. 5 is a cross-sectional view that schematically shows portions to which either the first adhesive paste or the second adhesive paste is applied in the first embodiment of the present invention.

FIG. 5 is a cross-sectional view that schematically shows portions to which either the adhesive paste A or the adhesive paste B is applied in the present embodiment.

In FIG. 5, a circle indicated by a dotted line represents a cutting position to be cut to obtain a round pillar-shaped ceramic block in a periphery cutting process, which will be described later.

Upon forming an adhesive paste layer, the adhesive paste B is applied between four pieces of honeycomb fired bodies located at four corners in a honeycomb aggregated body 150 to be manufactured so that adhesive paste layers 130 are formed. In particular, the adhesive paste B is applied between honeycomb fired bodies to be periphery small honeycomb fired bodies and a honeycomb fired body adjacent thereto to form the adhesive paste layer 130.

Moreover, the adhesive paste A is applied between 16 pieces of honeycomb fired bodies to be center-portion honeycomb fired bodies to form adhesive paste layers 120.

Here, although the kinds of the adhesive paste layers to be formed in the other portions are not particularly limited, the adhesive paste layers 120 are formed by using the adhesive paste A in the present embodiment.

Next, the honeycomb aggregated body is heated, and the adhesive paste layers are consequently dried and solidified to form the adhesive layer A and the adhesive layer B; thus, a ceramic block in which a plurality of honeycomb fired bodies are combined with one another with an adhesive layer interposed therebetween is manufactured.

In this manner, by applying the two kinds of adhesive pastes to appropriate portions to form adhesive layers, the adhesive layer A and the adhesive layer B having different properties from each other are formed in appropriate portions so that the honeycomb fired bodies are bonded to one another to manufacture a ceramic block.

The following description will discuss all the manufacturing processes for manufacturing the honeycomb structure.

A molding process is carried out to manufacture a honeycomb molded body by extrusion-molding a wet mixture containing ceramic powders and a binder.

First, as a ceramic raw material, silicon carbide powders having different average particle diameters, an organic binder, a plasticizer in liquid form, a lubricant and water are mixed by using a mixer to prepare a wet mixture for manufacturing a honeycomb molded body.

Successively, this wet mixture is loaded into an extrusion molding machine.

When the wet mixture is loaded into the extrusion molding machine, the wet mixture is extrusion-molded into a honeycomb molded body having a predetermined shape.

Next, the honeycomb molded body is cut into a predetermined length, and dried by using a drying apparatus, such as a microwave drying apparatus, a hot-air drying apparatus, a dielectric drying apparatus, a reduced-pressure drying apparatus, a vacuum drying apparatus and a freeze drying apparatus, and a sealing process is carried out by filling predetermined cells with a plug material paste to be a plug for sealing the cells.

Here, conditions conventionally used upon manufacturing a honeycomb fired body are applicable for carrying out the cutting process, the drying process and the sealing process.

Next, a degreasing process is carried out to remove the organic components in the honeycomb molded body by heating the honeycomb molded body in a degreasing furnace. Then, the degreased honeycomb molded body is transported to a firing furnace, and a firing process is carried out to manufacture a honeycomb fired body.

By following the above-mentioned processes, the honeycomb fired body is manufactured.

Here, conditions conventionally used upon manufacturing a honeycomb fired body are applicable for carrying out the degreasing process and the firing process.

Thereafter, the combining process described above is carried out on a plurality of honeycomb fired bodies to form a ceramic block. Further, a periphery cutting process is carried out to form the ceramic block into a round pillar-shape by cutting the side faces of the ceramic block using a diamond cutter or the like.

Moreover, a coating layer forming process is carried out to form a coat layer on the periphery of the ceramic block formed into a round pillar-shape by applying a sealing material paste to the periphery of the round pillar-shaped ceramic block, then drying and solidifying the sealing material paste.

Here, the sealing material paste may preferably contain the same materials as those of the adhesive paste A and the adhesive paste B. Alternatively, the sealing material paste may contain a different material.

Here, the coat layer does not necessarily need to be formed, and may be formed on demand.

The honeycomb structure can be manufactured by following the above-mentioned processes.

The following description will summarize the effects of the honeycomb structure of the present embodiment.

(1) The honeycomb structure of the present embodiment includes a periphery honeycomb bonded body formed by bonding the periphery small honeycomb fired body and at least a single pieces of the other honeycomb fired body with the adhesive layer B having high thermal conductivity interposed therebetween.

Since the periphery honeycomb bonded body is bonded by the adhesive layer B having higher thermal conductivity, the thermal conductivity property inside the periphery honeycomb bonded body tends to be high. Therefore, it may become easier to uniform the temperature distribution inside the periphery honeycomb bonded body. Moreover, since the periphery small honeycomb fired bodies are not separated by the adhesive layer having low thermal conductivity, a temperature difference between the periphery small honeycomb fired bodies and the honeycomb fired bodies located in the center portion of the honeycomb structure tends to be smaller.

For this reason, it may become easier to avoid large thermal stress to be applied to the periphery small honeycomb fired bodies, thereby making it easy to avoid damage in the periphery small honeycomb fired bodies.

(2) Moreover, the center-portion honeycomb fired bodies are bonded to one another by interposing the adhesive layer A having low Young's modulus. For this reason, thermal stress applied to the center-portion honeycomb fired body tends to be alleviated by the adhesive layer, and thereby it may become easier to prevent the damage in the center-portion honeycomb fired body.

EXAMPLES

Example 1

The following description will discuss Examples that specifically disclose the first embodiment of the present invention. Here, the present invention is not intended to be limited only to these Examples.

(Manufacturing Process of Honeycomb Fired Body)

An amount of 52.8% by weight of a silicon carbide coarse powder having an average particle diameter of 22 μm and 22.6% by weight of a silicon carbide fine powder having an average particle diameter of 0.5 μm were mixed. To the resulting mixture, 2.1% by weight of an acrylic resin, 4.6% by weight of an organic binder (methylcellulose), 2.8% by weight of a lubricant (UNILUB, manufactured by NOF Corporation), 1.3% by weight of glycerin, and 13.8% by weight of water were added, and then kneaded to prepare a wet mixture. The obtained wet mixture was extrusion-molded, so that a raw honeycomb molded body having virtually the same shape as the shape shown in FIG. 3A and having cells not sealed was manufactured.

Next, the raw honeycomb molded body was dried by using a microwave drying apparatus to obtain a dried honeycomb molded body. Then, using a plug material paste having the same composition as that of the raw molded body, predetermined cells were filled, and the dried honeycomb molded body filled with the plug material paste was again dried by using a drying apparatus.

The dried honeycomb molded body was degreased at 400° C., and then fired at 2200° C. under normal pressure argon atmosphere for three hours, so that a honeycomb fired body including a silicon carbide sintered body, with a porosity of 45%, an average pore diameter of 15 μm, a size of 34.3 mm×34.3 mm×150 mm, the number of cells (cell density) of 300 pcs/inch$^2$ and a thickness of the cell wall of 0.25 mm (10 mil), was manufactured.

(Preparation of Adhesive Paste B)

An amount of 30% by weight of alumina fibers having an average fiber length of 10 μm, 21% by weight of silicon carbide particles having an average particle diameter of 0.6 μm, 15% by weight of silica sol, 5.6% by weight of carboxymethylcellulose, and 28.4% by weight of water were mixed and kneaded to prepare an adhesive paste B.

(Preparation of Adhesive Paste A)

An adhesive paste A having the same composition except that alumina fibers contained therein have an average fiber length of 50 μm was prepared.

(Combining Process)

A honeycomb fired body was placed on a base having a V-shaped cut surface as shown in FIG. 4 along the V-shape of the base. Thereafter, the adhesive paste was applied by using a squeegee to two side faces facing upward of the honeycomb fired body so as to form an adhesive paste layer. By repeatedly laminating another honeycomb fired body on the adhesive paste layer, a honeycomb aggregated body including 36 pieces of honeycomb fired bodies was manufactured.

At this time, the adhesive paste B is applied between the honeycomb fired bodies located in four corners of the honeycomb aggregated body, the adhesive paste A is applied between other honeycomb fired bodies.

Further, the adhesive paste is solidified by heating the honeycomb aggregated body at a temperature of 120° C. to form the adhesive paste layer A and the adhesive paste layer B so that a ceramic block was manufactured.

Each of the formed adhesive layer A and the formed adhesive layer B has a thickness of 1 mm.

(Periphery Cutting Process and Coat Layer Forming Process)

Next, the periphery of the ceramic block was cut into a round pillar-shape with a diameter of 200 mm by using a diamond cutter.

Successively, a sealing material paste layer having a thickness of 0.2 mm was formed on the periphery of the ceramic block by using a sealing material paste including the same materials as those of the adhesive paste A. The sealing material paste layer was dried at 120° C. to manufacture a round pillar-shaped honeycomb structure with a coat layer formed on the periphery thereof.

Example 2

An amount of water added upon preparing the adhesive paste was changed and 27% by weight of alumina fibers having an average fiber length of 10 μm, 19% by weight of silicon carbide particles having an average particle diameter of 0.6 μm, 14% by weight of silica sol, 5% by weight of carboxymethyl cellulose and 35% by weight of water were mixed and kneaded to prepare an adhesive paste A.

With respect to the components except water, a blending ratio of the composition of the adhesive paste A is the same as the composition of the adhesive paste B in Example 1.

A honeycomb structure was manufactured by following the same procedure as in Example 1 except that this adhesive paste A was used.

Example 3

The adhesive paste B was prepared by following the same procedure used in preparing the adhesive paste B in Example 1 except that aluminum phosphate was added as the inorganic binder added upon preparing the adhesive paste instead of silica sol.

A honeycomb structure was manufactured by following the same procedure as in Example except that this adhesive paste B was used.

Comparative Examples 1 and 2

In Comparative Example 1, only the adhesive paste A used in Example 1 was used as the adhesive paste to manufacture honeycomb structures.

On the contrary, in Comparative Example 2, only the adhesive paste B used in Example 1 was used as the adhesive paste to manufacture honeycomb structures.

(Measurement of Cross-Sectional Area of Honeycomb Fired Body)

The shapes of honeycomb fired bodies constituting the honeycomb structures and the shapes of the honeycomb structures manufactured in all Examples and Comparative Examples were all same. In the cross-sectional view of the honeycomb structure shown in FIG. 1, the cross-sectional area of a honeycomb fired body corresponding to the center-portion honeycomb fired body 60 was 11.8 $cm^2$, and the cross-sectional area of a honeycomb fired body corresponding to the periphery small honeycomb fired body 70 was 4.0 $cm^2$. That is, the cross-sectional area of the periphery small honeycomb fired body was 34% of the cross-sectional area of the center-portion honeycomb fired body.

Moreover, the cross-sectional area of a portion corresponding to the periphery honeycomb bonded body 90 was 21.3 cm$^2$, that is, 181% of the cross-sectional area of the center-portion honeycomb fired body.

(Measurement of Young's Modulus, Measurement of Thermal Conductivity)

The adhesive pastes A and the adhesive pastes B used in all Examples and Comparative Examples were dried and solidified to prepare an adhesive layer A and an adhesive layer B for testing.

The Young's modulus was measured on the respective adhesive layers for testing by using an autograph.

Moreover, the thermal conductivity thereof was measured by using a laser flash method.

(Durability to Cycle Driving Operations)

The presence or absence of cracks occurred due to thermal stress applied to the honeycomb structures was observed on the honeycomb structures manufactured in all Examples and Comparative Examples.

First, each of the manufactured honeycomb structures manufactured in all Examples and Comparative Examples was placed in an exhaust passage of an engine, and a commercially available catalyst supporting honeycomb structure made of cordierite (diameter: 200 mm, length: 100 mm, cell density: 400 cells/inch$^2$ amount of supported platinum: 5 g/L) was placed in the exhaust passage of an engine at a position closer to a gas-inlet side than the honeycomb structure as an exhaust gas purifying apparatus. Particulates were captured for 7 hours, while the engine was driven at the number of revolutions of 3000 min-1 and a torque of 50 Nm. The amount of the captured particulates was 8 g/L.

Thereafter, the engine was driven at the number of revolutions of 1250 min-1 and a torque of 60 Nm, and when the temperature of the filter became constant, the state was kept for one minute. Thereafter, a post injection was performed, and then the temperature of exhaust gases was raised by utilizing the oxidation catalyst present at the front side of the exhaust gas purifying apparatus to burn particulates.

The conditions for the post injection were set so that the temperature of the center portion of the honeycomb structures was raised and became almost constant at 600° C. within one minute from the initiation. Then, the above-mentioned processes were repeated 10 times, and observations were performed visually or using a magnifying microscope (magnification: 5 times) to determine whether or not any cracks had occurred in the honeycomb fired bodies.

Table 1 shows the Young's modulus and the thermal conductivity of the adhesive layers manufactured in all Examples and Comparative Examples by using the adhesive paste and the results of the durability test of the honeycomb structures together.

TABLE 1

|  | Young's modulus (GPa) | | Thermal conductivity (W/mK) | | Presence or absence of cracks after durability test | |
| --- | --- | --- | --- | --- | --- | --- |
|  | Adhesive layer A | Adhesive layer B | Adhesive layer A | Adhesive layer B | Periphery small honeycomb fired body | Center portion honeycomb fired body |
| Example 1 | 2 | 7 | 0.2 | 0.5 | Absence | Absence |
| Example 2 | 3 | 7 | 0.3 | 0.5 | Absence | Absence |
| Example 3 | 2 | 20 | 0.2 | 3.0 | Absence | Absence |
| Comparative Example 1 | 2 | NA | 0.2 | NA | Presence | Absence |
| Comparative Example 2 | NA | 7 | NA | 0.5 | Absence | Presence |

NA = Not Available

As shown by the results, no cracks occurred in the honeycomb structures manufactured in Examples 1 to 3. In contrast, cracks occurred in the periphery small honeycomb fired bodies in the honeycomb structure manufactured in Comparative Example 1.

It is presumed that the cracks occurred because in the honeycomb structure manufactured in Comparative Example 1, the low thermal conductivity of the adhesive layer bonding the periphery small honeycomb fired body and the other honeycomb fired body causes difficulties in transmitting heat to the periphery small honeycomb fired body.

Moreover, in the honeycomb structure manufactured in Comparative Example 2, cracks occurred in the center-portion honeycomb fired bodies.

It is presumed that the cracks occurred because in the honeycomb structure manufactured in Comparative Example 2, the high Young's modulus of the adhesive layer bonding the center-portion honeycomb fired bodies to one another causes difficulties in alleviating thermal stress applied to the adjacent center-portion honeycomb fired bodies.

Second Embodiment

The following description will discuss a second embodiment that is an other embodiment of the present invention.

Figure 6:
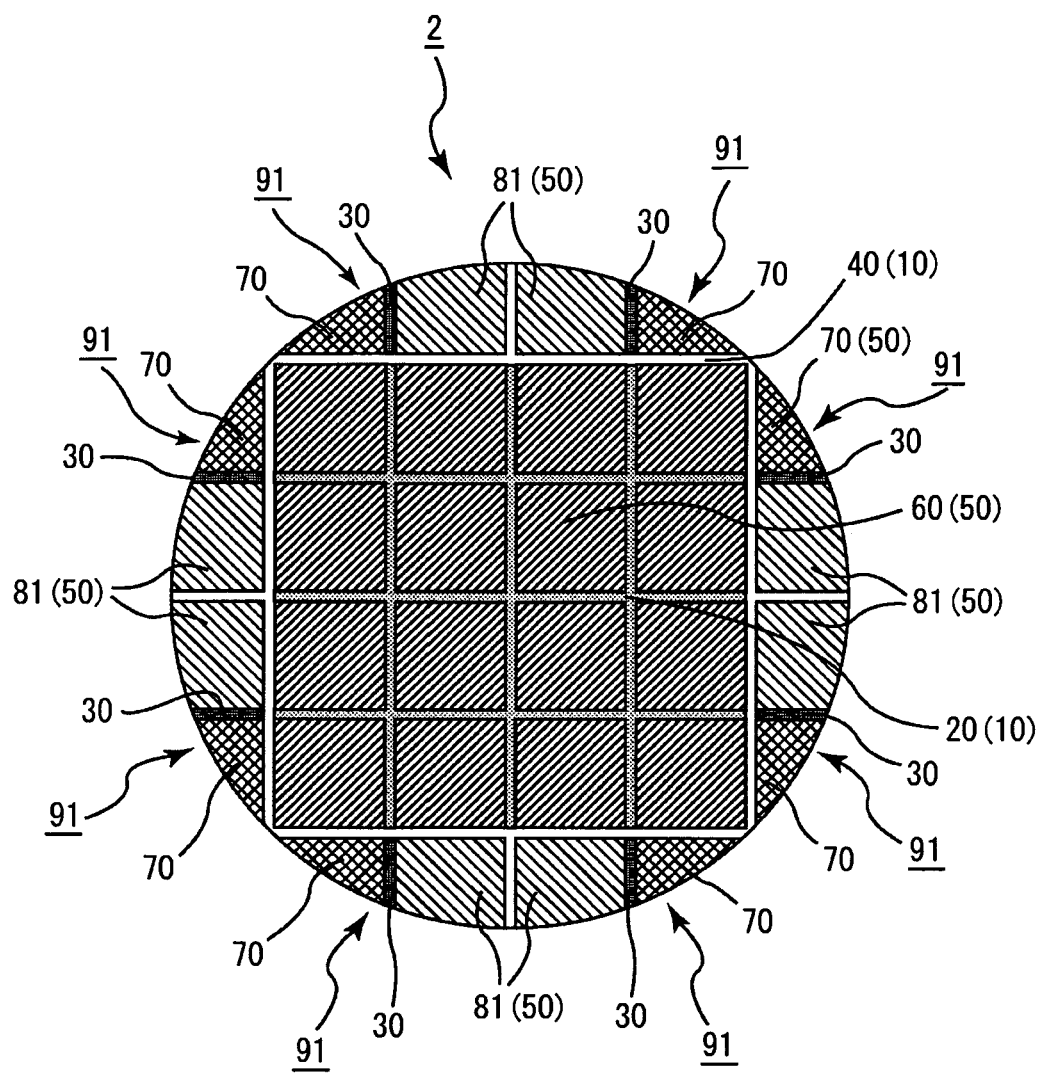
FIG. 6 is a cross-sectional view that schematically shows one example of a honeycomb structure of the second embodiment of the present invention.

FIG. 6 is a cross-sectional view that schematically shows one example of a honeycomb structure of the second embodiment.

In a honeycomb structure 2 in the present embodiment, periphery honeycomb bonded bodies 91 include two honeycomb fired bodies: a periphery small honeycomb fired body 70; and an adjacent honeycomb fired body 81.

Except the above-mentioned structure, the honeycomb structure of the second embodiment is configured to be the same as the honeycomb structure of the first embodiment.

The periphery small honeycomb fired body 70 and the honeycomb fired body 81 that constitute the periphery honeycomb bonded body 91 are bonded to each other with an adhesive layer 30 (adhesive layer B) interposed therebetween. Moreover, the cross-sectional area of the periphery honeycomb bonded body 91 is about 60% or more of the cross-sectional area of a center-portion honeycomb fired body 60.

For this reason, also in the honeycomb structure of the present embodiment, the periphery honeycomb bonded body having a comparatively large cross-sectional area can be regarded as a single piece of the honeycomb fired body.

That is, the honeycomb structure of the present embodiment can be regarded to have no honeycomb fired bodies that form the periphery of the honeycomb structure and have a small cross-sectional area.

Since the honeycomb structure of the present embodiment can be manufactured by using the same method as the method for manufacturing the honeycomb structure of the first embodiment except that the position of the adhesive layer B to be formed in the combining process is altered. Therefore, the detailed explanation for the manufacturing method thereof will be omitted.

Here, the honeycomb structure of the present embodiment can also exert the same effects (1) and (2) as those of the honeycomb structure of the first embodiment.

Third Embodiment

The following description will discuss a third embodiment that is a still other embodiment of the present invention.

The honeycomb structure of the present embodiment is configured to be the same as the honeycomb structure of the first embodiment, but a different method from the method for forming an adhesive layer is used in the method for manufacturing a honeycomb structure.

Figures 7A, 7B, 7C:
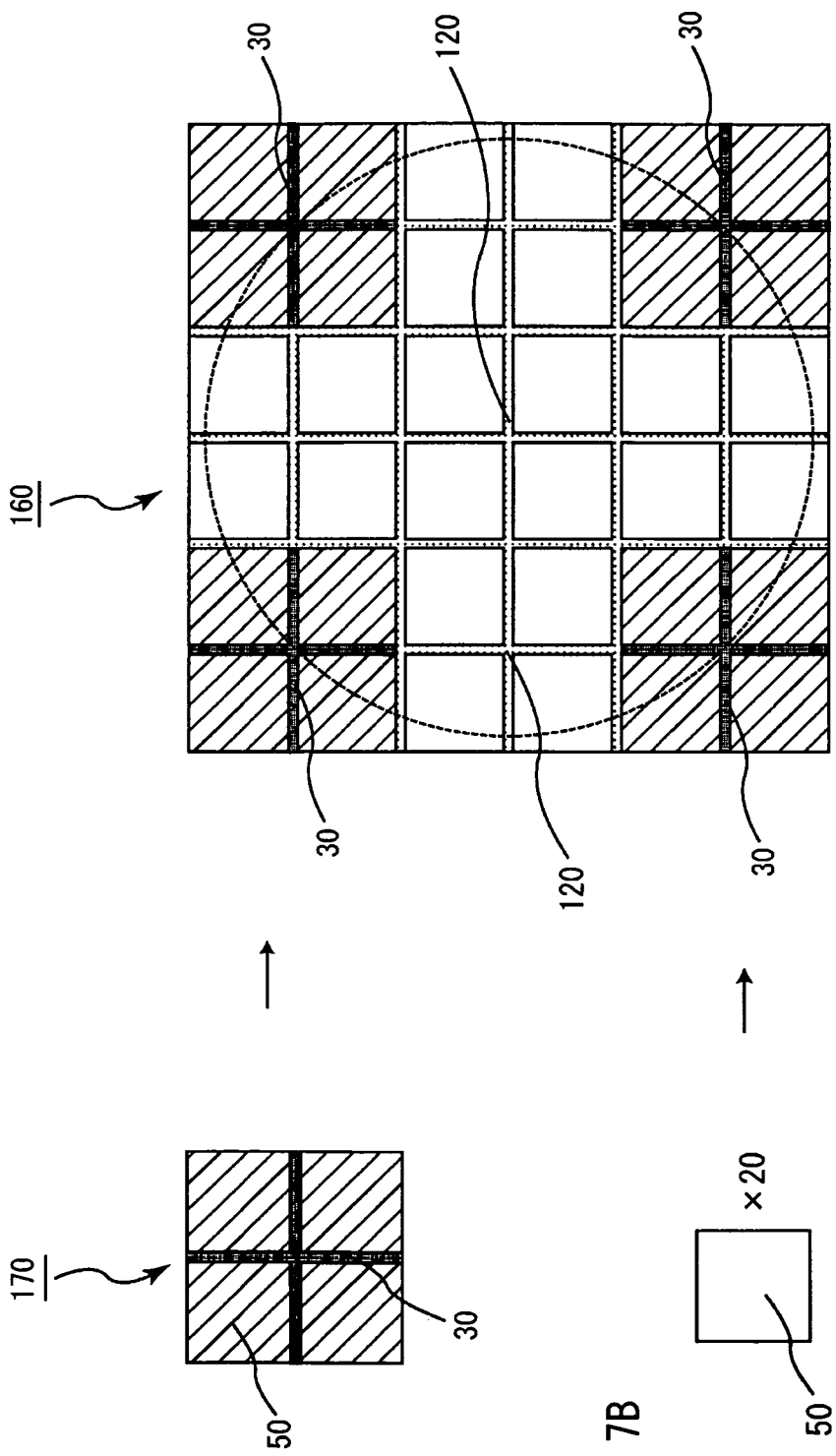
FIGS. 7A, 7B and 7C are explanatory views each schematically showing a part of a combining process of the third embodiment of the present invention.

FIGS. 7A, 7B and 7C are explanatory views each schematically showing a part of a combining process of the present embodiment.

In the combining process of the present embodiment, an adhesive layer A and an adhesive layer B having different properties from each other are formed as follows: one kind of an adhesive paste is used; and adhesive paste layers are heated at a different temperature from each other.

First, as shown in FIG. 7A, an adhesive paste layer is formed between four honeycomb fired bodies 50, and the adhesive paste is solidified by drying at about 120° C., and then heated at about 1000° C. to form an adhesive layer 30.

The adhesive layer formed at this time corresponds to the adhesive layer B.

By following such procedure, a periphery honeycomb aggregated body 170 formed by combining four pieces of honeycomb fired bodies with one another with the adhesive layer B interposed therebetween is manufactured.

In the present embodiment, four pieces of the periphery honeycomb aggregated bodies 170 are prepared.

Moreover, separately, 20 pieces of honeycomb fired bodies 50 are prepared (see FIG. 7B).

As shown in FIG. 7C, an adhesive paste layer 120 is formed between the honeycomb fired bodies 50, as well as between the honeycomb fired bodies 50 and the four pieces of periphery honeycomb aggregated bodies 170 to manufacture a honeycomb aggregated body 160.

Here, the same adhesive paste as the adhesive paste used upon forming the adhesive layer 30 may be used.

Next, after drying at about 120° C. to solidify the adhesive paste (adhesive paste layer 120), the honeycomb aggregated body is further heated at about 500° C. to form an adhesive layer. The adhesive layer formed at this time corresponds to the adhesive layer A.

A honeycomb structure can be manufactured by following the same procedure as in the method for manufacturing a honeycomb structure of the first embodiment except the above-mentioned procedure. Therefore, the detailed description thereof will be omitted.

The adhesive layer A thus formed is an adhesive layer having a low density, and the adhesive layer B thus formed is an adhesive layer having a high density. Here, the thermal conductivity and the Young's modulus of the adhesive layer B are higher than those of the adhesive layer A.

Therefore, the honeycomb structure of the present embodiment can also exert the same effects (1) and (2) as those of the honeycomb structure of the first embodiment.

Other Embodiments

The honeycomb structure according to the embodiments of the present invention need not have an end portion of each cell sealed. Such a honeycomb structure may be desirably used as a catalyst supporting carrier.

Although not particularly limited, the shape of the honeycomb fired bodies is preferably designed to easily combine the honeycomb fired bodies with one another when forming a honeycomb structure. For example, a square, rectangular, hexagonal or sector shape may be used as its cross-sectional shape.

The shape of the honeycomb structure according to the embodiments of the present invention is not particularly limited to a round pillar-shape, and may be a desired pillar shape such as a cylindroid shape and a polygonal pillar shape.

Further, the number of the honeycomb fired bodies constituting the honeycomb structure is not limited to 32 pieces as in the above-mentioned embodiments, and the number may be more or less than 32 pieces.

An inorganic binder, inorganic fibers and inorganic particles contained in the adhesive paste are not particularly limited. Examples of the inorganic binder contained in the adhesive paste include silica sol, alumina sol, and the like. These may be used alone, or in a combination of two or more. Out of the inorganic binders, silica sol is preferably used.

Examples of the inorganic fibers contained in the adhesive paste include ceramic fibers such as silica-alumina, mullite, alumina and silica, and the like. Each of these may be used alone or two or more kinds of these may be used in combination. Out of the inorganic fibers, alumina fibers are preferably used.

Examples of the inorganic particles contained in the adhesive paste include carbides, nitrides, and the like, more specifically, inorganic powder including silicon carbide, silicon nitride, boron nitride or the like. Each of these may be used alone, or two or more kinds of these may be used in combination. Out of the inorganic particles, silicon carbide, which is superior in thermal conductivity, is more preferably used.

Furthermore, a pore-forming agent such as balloons that are fine hollow spheres including oxide-based ceramics, spherical acrylic particles, graphite and the like may be added to the adhesive paste, if necessary, to adjust the thermal conductivity and the Young's modulus of the adhesive paste layer. This is because voids are formed in the adhesive layer.

The balloon is not particularly limited, and examples thereof include alumina balloon, glass micro balloon, shirasu balloon, fly ash balloon (FA balloon), mullite balloon and the like. Alumina balloon is desirable among these.

The porosity of the honeycomb fired body is not particularly limited, and desirably at least about 35% and at most about 60%.

When the honeycomb structured body honeycomb structure is used as a filter, the porosity of about 35% or more tends not to cause clogging in the honeycomb structure. In contrast, the porosity of about 60% or less tends not to cause a reduction in the strength of the honeycomb fired body, resulting in less possible breakage.

The average pore diameter of the honeycomb fired body is desirably at least about 5 µm and at most about 30 µm.

When the honeycomb structured body honeycomb structure is used as a filter, the average pore diameter of 5 µm or more tends not to cause clogging due to particulates. In contrast, the average pore diameter of 30 µm or less tends not to cause particulates to pass through the pores. As a result, the honeycomb fired body tends not to fail to capture the particulates, which enables functioning as a filter.

Here, the porosity and the average pore diameter can be measured through conventionally known methods such as a mercury porosimetry, Archimedes method, and a measuring method using a scanning electronic microscope (SEM).

The cell density in the cross-section perpendicular to the longitudinal direction of the honeycomb fired body is not particularly limited. However, a desirable lower limit thereof is about 31.0 pcs/cm2 (about 200 pcs/inch$^2$) and a desirable upper limit is about 93.0 pcs/cm$^2$ (about 600 pcs/inch$^2$). A more desirable lower limit is about 38.8 pcs/cm$^2$ (about 250 pcs/inch$^2$) and a more desirable upper limit is about 77.5 pcs/cm$^2$ (about 500 pcs/inch$^2$).

Further, the thickness of the cell walls of the honeycomb fired body is not particularly limited, and desirably at least about 0.1 mm and at most about 0.4 mm.

The main component of constituent materials of the honeycomb fired body is not limited to silicon carbide. Examples of other ceramic materials may include ceramic powders, for example, nitride ceramics such as aluminum nitride, silicon nitride, boron nitride and titanium nitride; carbide ceramics such as zirconium carbide, titanium carbide, tantalum carbide and tungsten carbide; oxide ceramics such as alumina, zirconia, cordierite, mullite, and aluminum titanate; and the like.

Out of these components, non-oxide ceramics are preferable, and silicon carbide is more preferable because this is excellent in thermal resistance properties, mechanical strength, thermal conductivity and the like. Moreover, examples of the constituent material of the honeycomb structure also include silicon-containing ceramics, in which metallic silicon is blended with the above-described ceramics, as well as a ceramic material such as ceramic bound by silicon or silicate compounds. And out of these, those ceramics (silicon-containing silicon carbide) in which metallic silicon is blended with silicon carbide are desirably used.

Especially, a silicon-containing silicon carbide ceramic containing about 60% by weight or more of silicon carbide is desirable.

The particle diameter of the ceramic powder is not particularly limited, and the ceramic powder that tends not to cause the case where the size of the honeycomb fired body manufactured by the following firing treatment becomes smaller than that of the honeycomb molded body after degreased is preferable.

The organic binder in the wet mixture is not particularly limited, and examples thereof include methylcellulose, carboxymethylcellulose, hydroxyethylcellulose, polyethylene glycol, and the like. Methylcellulose is desirable out of these. A blending amount of the organic binder is desirably at least about 1 part by weight and at most about 10 parts by weight with respect to 100 parts by weight of ceramic powder.

The plasticizer in the wet mixture is not particularly limited, and examples thereof include glycerin and the like. The lubricant is not particularly limited, and examples thereof include polyoxyalkylene-based compounds such as polyoxyethylene alkyl ether and polyoxypropylene alkyl ether, and the like.

Specific examples of the lubricant include polyoxyethylene monobutyl ether, polyoxypropylene monobutyl ether, and the like.

Moreover, the plasticizer and the lubricant may not be contained in the wet mixture in some cases.

In addition, a dispersant solution may be used upon preparing a wet mixture, and examples of the dispersant solution include water, an organic solvent such as benzene, alcohol such as methanol, and the like.

Furthermore, a molding auxiliary may be added to the wet mixture.

The molding auxiliary is not particularly limited, and examples thereof include ethylene glycol, dextrin, fatty acid, fatty acid soap, polyalcohol and the like.

Furthermore, a pore-forming agent such as balloons that are fine hollow spheres including oxide-based ceramics, spherical acrylic particles, graphite and the like may be added to the wet mixture, if necessary.

The balloon is not particularly limited, and examples thereof include alumina balloon, glass micro balloon, shirasu balloon, fly ash balloon (FA balloon), mullite balloon and the like. Alumina balloon is desirable out of these.

The plug material paste for sealing the cells is not particularly limited, a plug to be manufactured through the subsequent processes desirably has a porosity of at least about 30% and at most about 75%, and for example, it is possible to use a plug material paste having the same composition as that of the wet mixture of the raw material.

The catalyst to convert or purify exhaust gases may be supported on the honeycomb structure, and desirable examples of the catalyst to be supported include noble metals such as platinum, palladium and rhodium. Out of these, platinum is more desirable. Moreover, an alkali metal such as potassium and sodium, and an alkali earth metal such as barium may be used as other catalysts. These catalysts may be used alone, or two or more kinds of these may be used in combination.

Moreover, it may be possible to manufacture a plurality of kinds of honeycomb fired bodies, each kind having a different cross-sectional shape. Further, it may be possible to combine the above-mentioned plurality of kinds of honeycomb fired bodies to manufacture a ceramic block having a predetermined shape without cutting the periphery thereof.

Examples of the method for forming the adhesive paste layer are not particularly limited and may include a method in which each of the honeycomb fired bodies is temporally fixed in a molding frame having the virtually same shape as the shape of the ceramic block to be manufactured and an adhesive paste is injected into the each gap between the honeycomb fired bodies, and the like.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb structure comprising:
a plurality of honeycomb fired bodies each having cell walls extending along a longitudinal direction of the honeycomb structure to define cells; and
an adhesive layer provided between the honeycomb fired bodies to connect the honeycomb fired bodies and including a first adhesive layer and a second adhesive layer,
wherein the honeycomb fired bodies consist of center-portion honeycomb fired bodies and periphery honeycomb fired bodies, the center-portion honeycomb fired bodies not forming a part of a periphery of a cross-section of the honeycomb structure perpendicular to the longitudinal direction, the periphery honeycomb fired bodies forming a part of a periphery of the cross-section,
wherein the periphery honeycomb fired bodies include at least a single piece of a periphery small honeycomb fired body having in the cross-section a cross-sectional area which is less than about 60% of a cross-sectional area of a single piece of the center-portion honeycomb fired body,
wherein the periphery small honeycomb fired body is bonded to a honeycomb fired body which is adjacent to the periphery small honeycomb fired body with the second adhesive layer to form a honeycomb bonded body, a cross-sectional area of the periphery honeycomb bonded body in the cross-section being about 60% or more of the cross-sectional area of a single piece of the center-portion honeycomb fired body,
wherein all boundaries between each of the center-portion honeycomb fired bodies are bonded with the first adhesive layer,
wherein the second adhesive layer has thermal conductivity higher than thermal conductivity of the first adhesive layer, and the second adhesive layer has Young's modulus higher than Young's modulus of the first adhesive layer, and
wherein the center-portion honeycomb fired bodies include all honeycomb fired bodies of the honeycomb structure that do not contact an outer periphery of the honeycomb structure.

2. A honeycomb structure comprising:
a plurality of honeycomb fired bodies each having cell walls extending along a longitudinal direction of the honeycomb structure to define cells; and
an adhesive layer provided between the honeycomb fired bodies to connect the honeycomb fired bodies and including a first adhesive layer and a second adhesive layer,
wherein the honeycomb fired bodies include center-portion honeycomb fired bodies and periphery honeycomb fired bodies, the center-portion honeycomb fired bodies not forming a part of a periphery of a cross-section of the honeycomb structure perpendicular to the longitudinal direction, the periphery honeycomb fired bodies forming a part of a periphery of the cross-section,
wherein the periphery honeycomb fired bodies include at least a single piece of a periphery small honeycomb fired body having in the cross-section a cross-sectional area which is less than about 60% of a cross-sectional area of a single piece of the center-portion honeycomb fired body,
wherein the periphery small honeycomb fired body is bonded to a honeycomb fired body which is adjacent to the periphery small honeycomb fired body with the second adhesive layer to form a honeycomb bonded body, a cross-sectional area of the periphery honeycomb bonded body in the cross-section being about 60% or more of the cross-sectional area of a single piece of the center-portion honeycomb fired body,
wherein all boundaries between each of the center-portion honeycomb fired bodies are bonded with the first adhesive layer,
wherein the second adhesive layer has thermal conductivity higher than thermal conductivity of the first adhesive layer, and the second adhesive layer has Young's modulus higher than Young's modulus of the first adhesive layer, and
wherein the center-portion honeycomb fired bodies include all honeycomb fired bodies of the honeycomb structure that do not contact an outer periphery of the honeycomb structure.

3. The honeycomb structure according to claim 2, wherein said periphery small honeycomb fired body is bonded to a honeycomb fired body having a largest cross-sectional area in said cross-section among honeycomb fired bodies adjacent to said periphery small honeycomb fired body with said second adhesive layer.

4. The honeycomb structure according to claim 2, wherein thermal conductivity of said first adhesive layer is at least about 0.05 W/m/K and at most about 0.3 W/m/K, and thermal conductivity of said second adhesive layer is at least about 0.3 W/m/K and at most about 1 W/m/K.

5. The honeycomb structure according to claim 2, wherein Young's modulus of said first adhesive layer is at least about 0.1 GPa and at most about 3 GPa, and Young's modulus of said second adhesive layer is at least about 3 GPa and at most about 15 GPa.

6. The honeycomb structure according to claim 2, wherein said second adhesive layer has composition with a higher density than a density of said first adhesive layer.

7. The honeycomb structure according to claim 2, wherein the first adhesive layer, the second adhesive, or both thereof includes inorganic fibers and an inorganic binder; inorganic particles and an inorganic binder; or inorganic fibers, inorganic particles and an inorganic binder.

8. The honeycomb structure according to claim 7, wherein said first adhesive layer, said second adhesive, or both thereof includes said inorganic fibers and said inorganic binder; or said inorganic particles and said inorganic binder, and
said inorganic fibers or said inorganic particles is at least about 70% by weight and at most about 95% by weight relative to at least about 5% by weight and at most about 30% by weight of the inorganic binder as solids content; or
wherein
said first adhesive layer, said second adhesive, or both thereof includes said inorganic fibers, said inorganic particles and said inorganic binder, and a content of said inorganic particles is at least about 35% by weight and at most about 65% by weight and a content of said inorganic fibers is at least about 30% by weight and at most about 60% by weight relative to at least about 5% by weight and at most about 30% by weight of the inorganic binder as solids content.

9. The honeycomb structure according to claim 7, wherein
said first adhesive layer and said second adhesive layer include inorganic fibers, and
a fiber length of said inorganic fibers contained in said first adhesive layer is longer than a fiber length of said inorganic fibers contained in said second adhesive layer.

10. The honeycomb structure according to claim 9, wherein
an average fiber length of said inorganic fibers contained in said first adhesive layer is at least about 20 μm and at most about 1000 μm, and
an average fiber length of said inorganic fibers contained in said second adhesive layer is at least about 1 μm and at most about 20 μm.

11. The honeycomb structure according to claim 7, wherein
said inorganic binder contained in said first adhesive layer includes silica sol, and
said inorganic binder contained in said second adhesive layer includes at least one of aluminum phosphate and water glass.

12. The honeycomb structure according to claim 7, wherein
said inorganic binder comprises at least one of silica sol and alumina sol.

13. The honeycomb structure according to claim 7, wherein
said inorganic fibers comprise at least one of silica-alumina, mullite, alumina and silica.

14. The honeycomb structure according to claim 7, wherein
said inorganic particles comprise at least one of carbides and nitrides.

15. The honeycomb structure according to claim 14, wherein
said inorganic particles comprise at least one of silicon carbide, silicon nitride and boron nitride.

16. The honeycomb structure according to claim 2, wherein
said adhesive layer is formed by drying and solidifying an adhesive paste layer.

17. The honeycomb structure according to claim 2, wherein
said first adhesive layer and said second adhesive layer are formed by using one kind of an adhesive paste.

18. The honeycomb structure according to claim 2, wherein
said honeycomb fired body comprises at least one of silicon carbide and silicon-containing silicon carbide.

19. The honeycomb structure according to claim 2, wherein either one end portion of each of said cells is sealed.

20. The honeycomb structure according to claim 2, wherein an end portion of each of said cells is not sealed.

21. The honeycomb structure according to claim 2, further comprising a catalyst.

22. The honeycomb structure according to claim 1, wherein
the first adhesive layer and the second adhesive layer are formed of different material compositions.

23. A method for manufacturing a honeycomb structure, the method comprising:

molding a wet mixture containing ceramic powders and a binder to produce honeycomb molded bodies;
firing said honeycomb molded bodies to manufacture honeycomb fired bodies each having cell walls extending along a longitudinal direction of the honeycomb structure to define cells;
providing a first adhesive paste to form a first adhesive paste layer between center-portion honeycomb fired bodies among the honeycomb fired bodies in order to connect the center-portion honeycomb fired bodies, the center-portion honeycomb fired bodies not forming a part of a periphery of a cross-section of the honeycomb structure perpendicular to the longitudinal direction;
providing a pre-periphery honeycomb fired bodies among the honeycomb fired bodies having pre-periphery small honeycomb fired body to be a periphery small honeycomb fired body, the pre-periphery honeycomb fired bodies being to be periphery honeycomb fired bodies which form a part of a periphery of the honeycomb structure and which include at least a single piece of a periphery small honeycomb fired body having in the cross-section a cross-sectional area which is less than about 60% of a center-portion cross-sectional area of a single piece of the center-portion honeycomb fired body;
providing a second adhesive paste to form a second adhesive paste layer between the pre-periphery small honeycomb fired body and at least one piece of the honeycomb fired body to bond the pre-periphery small honeycomb fired body and the at least one piece of the honeycomb fired body in order to produce a periphery honeycomb bonded body, a honeycomb aggregated body comprising the connected center-portion honeycomb fired bodies and the periphery honeycomb bonded body, a cross-sectional area of the periphery honeycomb bonded body in the cross-section being about 60% or more of the center-portion cross-sectional area; and
drying and solidifying the first adhesive paste layer and the second adhesive paste layer to produce a ceramic block, the second adhesive layer having thermal conductivity higher than thermal conductivity of the first adhesive layer, the second adhesive layer having Young's modulus higher than Young's modulus of the first adhesive layer,
wherein all boundaries between each of the center-portion honeycomb fired bodies are bonded with the first adhesive layer, and
wherein the center-portion honeycomb fired bodies include all honeycomb fired bodies of the honeycomb structure that do not contact an outer periphery of the honeycomb structure.

24. The method for manufacturing a honeycomb structure according to claim 23, wherein
said second adhesive layer is formed between said pre-periphery small honeycomb fired body and a honeycomb fired body adjacent to the pre-periphery small honeycomb fired body.

25. The method for manufacturing a honeycomb structure according to claim 23, wherein
said first adhesive layer is formed between said honeycomb fired bodies other than honeycomb fired bodies to be said periphery honeycomb bonded body.

26. The method for manufacturing a honeycomb structure according to claim 23, wherein
said first adhesive paste and said second adhesive paste include inorganic fibers and an inorganic binder; inorganic particles and an inorganic binder; or inorganic fibers, inorganic particles and an inorganic binder.

27. The method for manufacturing a honeycomb structure according to claim 26, wherein
said first adhesive paste and said second adhesive paste include inorganic fibers, a fiber length of said inorganic fibers contained in said first adhesive paste being longer than a fiber length of said inorganic fibers contained in said second adhesive paste.

28. The method for manufacturing a honeycomb structure according to claim 27, wherein
an average fiber length of said inorganic fibers contained in said first adhesive paste is at least about 20 µm and at most about 1000 µm, and
an average fiber length of said inorganic fibers contained in said second adhesive paste is at least about 1 µm and at most about 20 µm.

29. The method for manufacturing a honeycomb structure according to claim 23, wherein
said first adhesive paste has a water content higher than a water content of said second adhesive paste.

30. The method for manufacturing a honeycomb structure according to claim 29, wherein
said water content of the first adhesive paste is at least about 30% by weight and at most about 50% by weight, and
said water content of the second adhesive paste is at least about 10% by weight and at most about 30% by weight.

31. The method for manufacturing a honeycomb structure according to claim 29, further comprising
adding a pore-forming agent to said second adhesive paste to obtain a relatively low water content.

32. The method for manufacturing a honeycomb structure according to claim 31, wherein
said pore-forming agent comprises at least one of balloons, spherical acrylic particles and graphite.

33. The method for manufacturing a honeycomb structure according to claim 23, further comprising:
applying one of the first adhesive paste and the second adhesive paste to side faces of a first honeycomb fired body of the honeycomb fired bodies to form one of the first adhesive paste layer and the second adhesive paste layer having a predetermined thickness;
placing a second honeycomb fired body of the honeycomb fired bodies on one of the first adhesive paste layer and the second adhesive paste layer; and
applying another one of the first adhesive paste and the second adhesive paste to side faces of the second honeycomb fired body of the honeycomb fired bodies to form another one of the first adhesive paste layer and the second adhesive paste layer having a predetermined thickness to produce the honeycomb aggregated body.

34. The method for manufacturing a honeycomb structure according to claim 23, wherein
producing the honeycomb aggregated body comprises
arranging a predetermined number of honeycomb fired bodies in a molding frame having substantially same shape as a shape of the honeycomb aggregated body to be manufactured, and
injecting the first adhesive paste or the second adhesive paste into each gap between said arranged honeycomb fired bodies to form an adhesive paste layer between said arranged honeycomb fired bodies.

35. The method for manufacturing a honeycomb structure according to claim 23, wherein
a plurality of kinds of honeycomb fired bodies each kind having a different cross-sectional shape are combined with one another to produce the ceramic block having a predetermined shape.

36. The method for manufacturing a honeycomb structure according to claim 23, further comprising
sealing either one end portion of each of said cells.

37. The method for manufacturing a honeycomb structure according to claim 23, further comprising:
cutting side faces of said ceramic block to form a ceramic block having a predetermined shape.

38. A method for manufacturing a honeycomb structure, the method comprising:
molding a wet mixture containing ceramic powders and a binder to produce honeycomb molded bodies;
firing said honeycomb molded bodies to manufacture honeycomb fired bodies each having cell walls extending along a longitudinal direction of the honeycomb structure to define cells;
providing a first adhesive paste to form a first adhesive paste layer between center-portion honeycomb fired bodies among the honeycomb fired bodies in order to connect the center-portion honeycomb fired bodies, the center-portion honeycomb fired bodies not forming a part of a periphery of a cross-section of the honeycomb structure perpendicular to the longitudinal direction;
providing pre-periphery honeycomb fired bodies among the honeycomb fired bodies having pre-periphery small honeycomb fired body to be a periphery small honeycomb fired body, the pre-periphery honeycomb fired bodies being to be periphery honeycomb fired bodies which form a part of a periphery of the honeycomb structure and which include at least a single piece of a periphery small honeycomb fired body having in the cross-section a cross-sectional area which is less than about 60% of a center-portion cross-sectional area of a single piece of the center-portion honeycomb fired body;
providing a second adhesive paste to form a second adhesive paste layer between the pre-periphery small honeycomb fired body and at least one piece of the honeycomb fired body to bond the pre-periphery small honeycomb fired body and the at least one piece of the honeycomb fired body in order to produce a periphery honeycomb bonded body, a honeycomb aggregated body comprising the connected center-portion honeycomb fired bodies and the periphery honeycomb bonded body, a cross-sectional area of the periphery honeycomb bonded body in the cross-section being about 60% or more of the center-portion cross-sectional area, the second adhesive layer having thermal conductivity higher than thermal conductivity of the first adhesive layer, the second adhesive layer having Young's modulus higher than Young's modulus of the first adhesive layer;
heating the first adhesive paste layer at a first temperature; and
heating the second adhesive paste layer at a second temperature which is different from the first temperature to produce a ceramic block,
wherein all boundaries between each of the center-portion honeycomb fired bodies are bonded with the first adhesive layer, and
wherein the center-portion honeycomb fired bodies include all honeycomb fired bodies of the honeycomb structure that do not contact an outer periphery of the honeycomb structure.

39. The method for manufacturing a honeycomb structure according to claim 38, wherein
said second adhesive layer is formed between said pre-periphery small honeycomb fired body and a honeycomb fired body adjacent to the pre-periphery small honeycomb fired body.

40. The method for manufacturing a honeycomb structure according to claim 38, wherein
said first adhesive layer is formed between said honeycomb fired bodies other than honeycomb fired bodies to be said periphery honeycomb bonded body.

41. The method for manufacturing a honeycomb structure according to claim 38, wherein
a second adhesive paste layer is formed between a plurality of said honeycomb fired bodies including the honeycomb fired body to be said periphery honeycomb bonded body,
the second adhesive paste layer is heated at a second temperature to manufacture a periphery honeycomb aggregated body,
a first adhesive paste layer is formed between other honeycomb fired bodies, and between the other honeycomb fired bodies and said periphery honeycomb aggregated body, and
the first adhesive paste layer is heated to form the first adhesive layer at a first temperature lower than the second temperature.

42. The method for manufacturing a honeycomb structure according to claim 41, wherein
the second adhesive paste layer is heated at about 1000° C., and
the first adhesive paste layer is heated at about 500° C.

43. The method for manufacturing a honeycomb structure according to claim 41, wherein
a predetermined number of honeycomb fired bodies are arranged in a molding frame having substantially same shape as a shape of said periphery honeycomb aggregated body or said ceramic block; and
injecting at least one of the first adhesive paste and the second adhesive paste into each gap between said honeycomb fired bodies, or between said honeycomb fired body and said periphery honeycomb aggregated body to form an adhesive paste layer between said honeycomb fired bodies, or between said honeycomb fired body and said periphery honeycomb aggregated body.

44. The method for manufacturing a honeycomb structure according to claim 38, wherein
the adhesive paste includes inorganic fibers and an inorganic binder; inorganic particles and an inorganic binder; or inorganic fibers, inorganic particles and an inorganic binder.

45. The method for manufacturing a honeycomb structure according to claim 38, wherein
one adhesive paste is applied to side faces of a first honeycomb fired body of the honeycomb fired bodies to form one adhesive paste layer having a predetermined thickness;
a second honeycomb fired body of the honeycomb fired bodies is placed on the adhesive paste layer;
the one adhesive paste is applied to side faces of the second honeycomb fired body to form another adhesive paste layer having a predetermined thickness; and
a third honeycomb fired body of the honeycomb fired bodies is placed on the another adhesive paste layer.

46. The method for manufacturing a honeycomb structure according to claim 38,
wherein a plurality of kinds of honeycomb fired bodies each kind having a different cross-sectional shape are combined with one another to produce the ceramic block having a predetermined shape.

47. The method for manufacturing a honeycomb structure according to claim 38, further comprising
sealing either one end portion of each of said cells.

48. The method for manufacturing a honeycomb structure according to claim 38, further comprising
cutting side faces of said ceramic block to form a ceramic block having a predetermined shape.

* * * * *